May 25, 1948.  P. F. QUINN ET AL  2,442,210
MACHINE FOR DICING FOOD PRODUCTS
Filed June 20, 1946  3 Sheets-Sheet 1
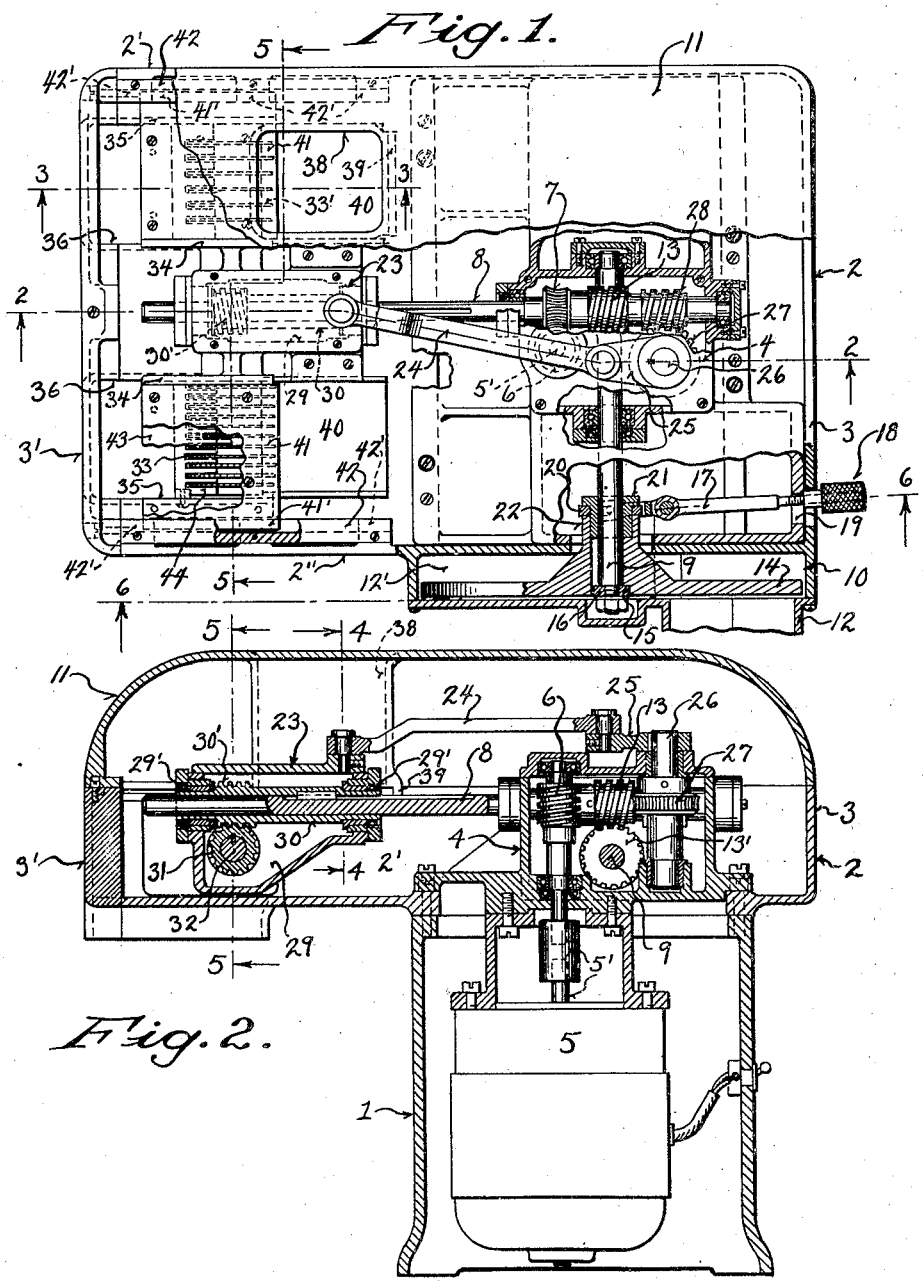
INVENTORS
PETER F. QUINN
HAROLD J. QUALHEIM
BY 
ATTORNEYS

INVENTORS
PETER F. QUINN
HAROLD J. QUALHEIM

BY

ATTORNEYS

May 25, 1948.    P. F. QUINN ET AL    2,442,210
MACHINE FOR DICING FOOD PRODUCTS
Filed June 20, 1946    3 Sheets—Sheet 3
Fig. 6.
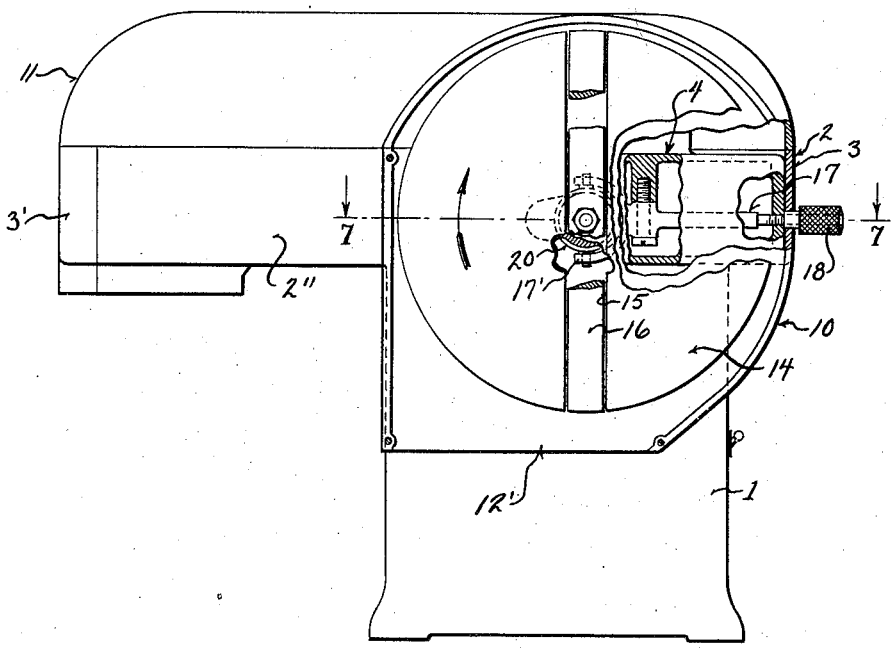
Fig. 7.
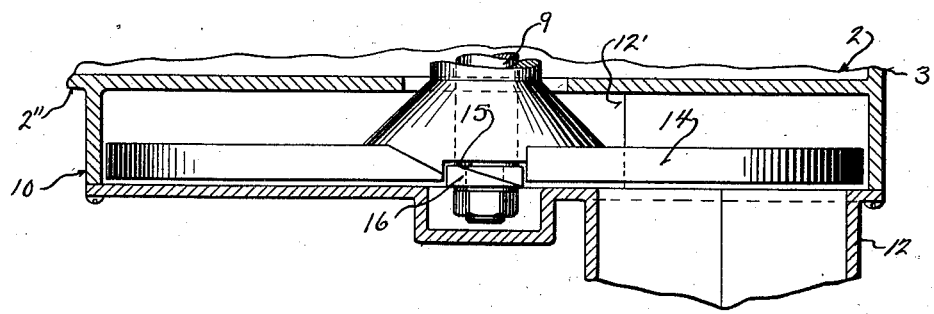
INVENTORS
PETER F. QUINN
HAROLD J. QUALHEIM
BY 
ATTORNEYS Patented May 25, 1948

2,442,210

UNITED STATES PATENT OFFICE 2,442,210

MACHINE FOR DICING FOOD PRODUCTS

Peter F. Quinn and Harold J. Qualheim, Racine, Wis., assignors to Qualheim, Inc., Racine, Wis.

Application June 20, 1946, Serial No. 677,993

1 Claim. (Cl. 146—78)

Our invention refers to machines for slicing vegetable products, and it has for its object to provide a machine embodying triple slicing devices in gear connection, one of which devices is adapted to cut whole slices from a product, while the other two devices are adapted to slice and split the slices into lengths, whereby, for example, shoestring potatoes and French fried potatoes are produced simultaneously with the slicing operation to economize in the time of preparing food products.

The specific objects of our invention are:

To provide an open mouthed casing for the several power driven slicing devices and their driving gears.

To provide a reciprocative carriage having fine and coarse gangs of splitting discs, the same being worm driven from a non-reciprocative rotary shaft.

To provide slicing blades mounted upon the reciprocative carriage having extensions for slidably guiding said carriage in channel strips carried by the casing.

To provide a housing having a nest of gears for imparting drive to the various slicing mechanisms from a motor unit.

To provide a simple driving mechanism for the slicing devices, wherein all journal bosses are oil-sealed to avoid oil holes and grease cups, whereby the mechanism is protected from steam and water cleaning.

Our present invention particularly refers to "Machines for preparing food products" disclosed in a co-pending application to Peter F. Quinn, patented August 20, 1946, No. 2,406,107.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a plan view of a machine embodying the features of our invention, with parts broken away and other parts in section to more clearly illustrate structural features, the section being partly indicated by line 7—7 of Fig. 6.

Fig. 2 is a longitudinal sectional elevation through the machine, the section being indicated by line 2—2 of Fig. 1.

Fig. 6 is an end view of the machine illustrating the rotary cutting disc with the cover plate removed and partly in section as indicated by line 6—6 of Fig. 1; and Fig. 7 is a plan view of the knife carrying cutting disc, with parts in section as indicated by line 7—7 of Fig. 6.

Figure 3:
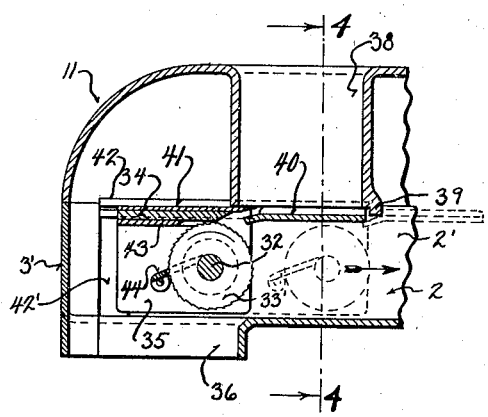
Fig. 3 is a fragmentary sectional elevation through the splitting discs and associated parts, the section being indicated by line 3—3 of Fig. 1.
Figure 4:
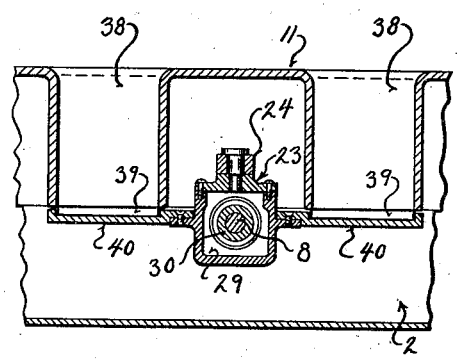
Fig. 4 is a fragmentary sectional end view of the machine through the feed hoppers, the section being indicated by line 4—4 of Fig. 2.

Referring by characters to the drawings, 1 indicates a hollow base, upon which is mounted an open mouthed casing 2 having side walls 2'—2" and an integral end wall 3, together with a removable front end wall 3'.

The bottom of the casing is formed with an opening therein aligned with the base 1 and secured about said bottom opening is a gear housing 4, to the bottom of which housing is secured an electric motor 5. The shaft 5' of the motor extends vertically upward through the housing and is suitably journaled therein.

The motor shaft carries a worm 6 in mesh with a worm wheel 7, which worm wheel is secured to a longitudinally disposed driven shaft 8, as best indicated in Figs. 1 and 2 of the drawings. The driven shaft 8 is suitably journaled in the housing 4, the said journals being properly sealed.

Also journaled in the housing 4 is a transversely disposed slicing disc shaft 9, the same being extended into a circular jacket 10. The jacket is upset from the casing in conjunction with a portion carried by the casing cover 11. The jacket has projecting therefrom an open mouthed hood 12 for the reception of root vegetables to be sliced. The bottom of the jacket is formed with a discharge mouth 12'.

The disc shaft 9 is driven by a worm 13 mounted on the shaft 8 in mesh with a worm wheel 13' secured to said disc shaft.

As best indicated in Figs. 1, 6 and 7, a slicing disc 14, mounted in the jacket 10, is splined to the shaft 9, whereby it may be longitudinally adjusted. The outer face of the disc 14 is provided with a radial slot 15 therein, into which slot is nested a radially disposed knife bar 16, which knife bar is secured to the end of the disc shaft 9. Hence, as shown in Fig. 7 of the drawings, it will be noted that the knife bar is slightly off-set, with reference to the face of the disc 14, whereby, upon its rotation, slices from a root vegetable may be cut and discharged through the mouth 12' of the jacket.

In order to slice a root vegetable into predetermined thicknesses, we provide a lever 17, which lever is pivoted to a boss extending downwardly from the housing 4, as shown in Fig. 6 of the drawings. The outer end of the lever is provided with a knurled knob 18, which knob projects through a slot in the casing wall 3 and is in threaded union with the end of the lever 17. This lever also extends through a slot 19 formed in one wall of the housing 4.

The inner end of the lever 17 terminates with a spanner 17', which spanner engages a ring 20 mounted in a groove formed by a bushing 21, which is secured within the end of a hub 22 extending inwardly from the disc. By the simple adjusting arrangement described, it will be noted, when the disc is to be moved in or out to regulate the thickness of the slice, the knob 18 is loosened and thereafter shifted back or forth in the slots, whereby the lever will properly adjust the face of the disc, with reference to the knife bar 16. Thereafter the knob is tightened upon the threaded end of the lever to bind said lever in its adjusted position, due to its frictional engagement with the housing wall. In adjusting this knob 18, it should be noted that the wall 3 of the casing may be suitably scored to indicate the exact position of the lever, with reference to the thickness of the slice.

Reciprocatively mounted upon the driven shaft 8 is a carriage 23, the same being positioned at the front end of the casing, as best indicated in Figs. 1 to 5, inclusive, of the drawings. Reciprocative motion is imparted to the carriage 23 by a pitman rod 24, having one end in pivotal union with the carriage, and the rear end in pivotal union with a crank arm 25.

The crank arm 25 is secured to the upper end of a vertically disposed stud shaft 26, the ends of which stud shaft are journaled in the upper and lower walls of the housing 4. The stud shaft is rotated by a worm wheel 27 carried thereby, in mesh with a worm 28, which worm is secured to the rear end of the power shaft 8.

The carriage 23 is provided with a central pocket 29 having sealed bearings 29', into which are journaled a sleeve 30 in spline connection with the extended end of the shaft 8, which shaft projects through the pocket bearings.

The sleeve 30 carries an integral worm 30', which worm meshes with a worm wheel 31 encased in the carriage pocket. The worm wheel 31 is secured to a transversely disposed countershaft 32 journaled in the pocket walls.

Figure 5:
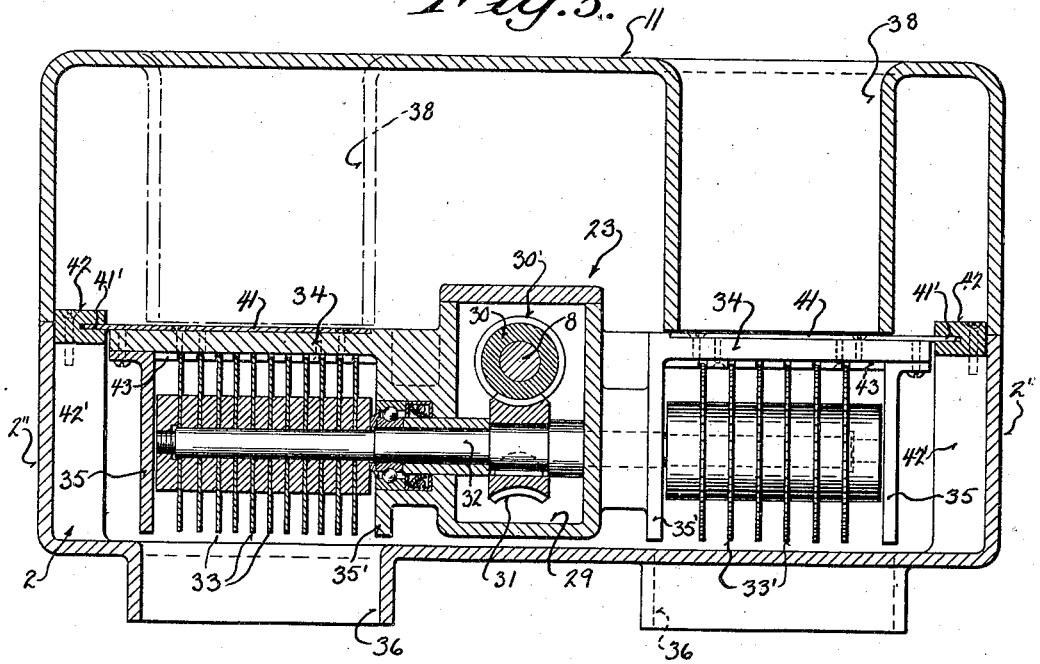
Fig. 5 is a cross section through the machine, the section being indicated by line 5—5 of Figs. 1 and 2.

As best indicated in Figs. 1 and 5 of the drawings, the projecting ends of the countershaft carry groups of saw-toothed cutting discs 33—33', which are spaced apart to split fine or coarse strips of root vegetables.

The pocket portion of the carriage 23 has extending therefrom, rearwardly of the splitting discs, a pair of wings 34 just above the groups of discs, and said disc groups are encased by outer facing plates 35 depending from the ends of the wings, and inner facing plates 35' which form part of the wings in conjunction with the carriage pocket, the same serving to deflect the split vegetable strips into discharge openings 36 formed in the bottom of the casing.

The mouth of the casing 2 has fitted thereover a cover 11 having at its rear end a pair of hoppers 38 provided with depending walls in juxtaposition with the carriage wings, the front wall being provided with a depending stop lip 39. The carriage 23 has extended therefrom a pair of bottom plates 40, the same being secured to the side walls of the carriage pocket and are positioned rearwardly of the carriage wings, the said plates being upon the same horizontal plane as the edge of the hopper lip 39.

The upper faces of the carriage wings 34 have secured thereto thin slicing blades 41 in slidable engagement with the lower edges of the hopper walls. These blades have track extensions 41', which extensions are slidably mounted in slots of channel strips 42, as best indicated in Fig. 5 of the drawings. The channel strips are preferably oil treated and are secured to ribs 42', which project inwardly from the side walls 2'—2'' of the casing 2. The blade extensions 41' and the channel strips thus form guides for the reciprocative carriage, whereby the same is held against lateral movement.

It will be noted that the upper peripheral edge of the saw-toothed splitting discs are directly under the rear edge of the wings. Hence, in order to deflect a slice fed to the discs, we provide separating combs 43, which are intermeshed with the disc peripheries and secured to the under face of the wings. After the strips have been severed by the discs, they are freed therefrom by engagement with a tangentially disposed stripping comb 44, which comb is secured to the wall plates 35.

From the foregoing description, it is apparent when a potato or other root product is forced downwardly into either one of the hoppers 38, it will come to rest upon the bottom plate 40, and as the carriage moves rearwardly, in the direction of the arrow in Fig. 3, a slice will be severed by the knife blade 41, and as the carriage continues in its cutting movement, the slice, being held against the lip 39, will be forced downwardly upon the slicing discs, whereby said slice will be cut into narrow strips and thereafter discharged through the casing mouth 36.

It should be understood that we provide a motor circuit make and break connection (not shown), whereby the current is cut off when the cover 11 is removed.

We claim:

A food product slicing and splitting machine comprising a casing, a removable cover therefor having depending walled feed hoppers, stop lips extending from the hopper walls, a reciprocative carriage having a pocket therein, wings extending from the pocket under the edges of the hopper walls, slicing blades secured to the wings having end extensions, hopper bottom plates extending from the carriage pockets in the rear of the wings and below the blades, a transversely disposed shaft journaled in the carriage pocket below the wings, groups of splitting discs carried by the shaft, guiding channel strips projecting from the casing walls in engagement with the blade extensions to form bearing supports for the blades and guides for the carriage, a sleeve having its ends journaled in the carriage pocket ends, a worm carried by the sleeve within the pocket, a worm wheel fixed upon the splitting disc shaft in mesh with the sleeve worm, and a longitudinally disposed drive shaft journaled in the sleeve in spline connection therewith.

PETER F. QUINN.
HAROLD J. QUALHEIM.

REFERENCES CITED

The following references are of record in the file of this patent:

UNITED STATES PATENTS

| Number | Name | Date |
| --- | --- | --- |
| 1,569,472 | Froney | Jan. 12, 1926 |
| 1,977,011 | Orfanson | Oct. 16, 1934 |
| 2,406,107 | Quinn | Aug. 20, 1946 |